(12) United States Patent
Krier et al.

(10) Patent No.: US 12,466,569 B2
(45) Date of Patent: Nov. 11, 2025

(54) METHOD FOR CONTROLLING A MULTI-ENGINE ROTARY-WING AIRCRAFT WITH REDUCED FUEL CONSUMPTION ON THE GROUND

(71) Applicant: AIRBUS HELICOPTERS, Marignane (FR)

(72) Inventors: Bernard Krier, Carry-Le-Rouet (FR); Ivan Chassagne, Franqueville-St-Pierre (FR)

(73) Assignee: AIRBUS HELICOPTERS, Marignane (FR)

( * ) Notice: Subject to any disclaimer, the term of this patent is extended or adjusted under 35 U.S.C. 154(b) by 123 days.

(21) Appl. No.: 18/441,489

(22) Filed: Feb. 14, 2024

(65) Prior Publication Data
US 2024/0343404 A1 Oct. 17, 2024

(30) Foreign Application Priority Data
Apr. 13, 2023 (FR) ........................... 2303657

(51) Int. Cl.
*B64D 31/04* (2006.01)
(52) U.S. Cl.
CPC .................... *B64D 31/04* (2013.01)
(58) Field of Classification Search
CPC ........ B64C 27/12; B64D 31/04; B64D 31/06; B64D 35/08; F02C 6/02; F05D 2220/329; F05D 2270/071; F05D 2270/13; F05D 2270/304
See application file for complete search history.

(56) References Cited

U.S. PATENT DOCUMENTS

| 10,112,723 | B2 * | 10/2018 | Rossotto | ................. | F02C 9/263 |
| 10,214,296 | B2 * | 2/2019 | Mercier-Calvairac | ....................... | F02C 7/262 |
| 11,554,874 | B2 * | 1/2023 | Drolet | .................... | B64D 31/06 |
| 11,663,863 | B2 * | 5/2023 | Manoukian | .............. | G07C 5/12 701/29.1 |
| 11,725,595 | B2 * | 8/2023 | Coutu | .................... | F01D 17/16 60/773 |

(Continued)

FOREIGN PATENT DOCUMENTS

| EP | 2735512 A1 | 5/2014 |
| FR | 2871138 A1 | 12/2005 |

(Continued)

OTHER PUBLICATIONS

French Search Report for French Application No. FR2303657, Completed by the French Patent Office, Dated Oct. 4, 2023, 9 pages.

*Primary Examiner* — Tyler J Lee
(74) *Attorney, Agent, or Firm* — BROOKS KUSHMAN P.C.

(57) ABSTRACT

A method for controlling an aircraft having at least two engines burning fuel and a transmission system connected to a rotary wing, each engine having a power shaft connected to the transmission system. An energy-saving phase comprises at least one energy-saving period comprising controlling, at an active rating, with a control system, one active engine from the at least two engines, and using the control system to stop or control, at an inactive rating, each inactive engine from the at least two engines that is not the active engine.

16 Claims, 3 Drawing Sheets

(56) References Cited

U.S. PATENT DOCUMENTS

| | | | |
|---|---|---|---|
| 11,732,643 B2* | 8/2023 | Ng | B64D 31/06 |
| | | | 60/785 |
| 11,859,563 B2* | 1/2024 | Ng | B64D 13/02 |
| 2006/0000300 A1 | 1/2006 | Vialle | |
| 2013/0219905 A1 | 8/2013 | Marconi et al. | |
| 2014/0145028 A1 | 5/2014 | Gomez | |
| 2016/0237917 A1 | 8/2016 | Marconi et al. | |
| 2018/0187604 A1 | 7/2018 | Poumarede et al. | |
| 2024/0343404 A1* | 10/2024 | Krier | B64D 31/04 |

FOREIGN PATENT DOCUMENTS

| | | | |
|---|---|---|---|
| FR | 2967132 B1 | 11/2012 | |
| FR | 2967133 B1 | 11/2012 | |
| FR | 3001525 A1 | 8/2014 | |
| FR | 3011587 A1 | 4/2015 | |

* cited by examiner

METHOD FOR CONTROLLING A MULTI-ENGINE ROTARY-WING AIRCRAFT WITH REDUCED FUEL CONSUMPTION ON THE GROUND

CROSS-REFERENCE TO RELATED APPLICATIONS

This application claims priority to French patent application No. FR 23 03657 filed on Apr. 13, 2023, the disclosure of which is incorporated in its entirety by reference herein.

TECHNICAL FIELD

The present disclosure relates to a method for controlling a multi-engine rotary-wing aircraft with reduced fuel consumption on the ground, and an aircraft implementing this method.

BACKGROUND

A rotary-wing aircraft may comprise several engines running on fuel for setting a rotary wing and accessories in motion. A rotorcraft may thus comprise several free turbine turboshaft engines for setting a power transmission system in motion, this power transmission system rotating at least one rotary wing, in particular.

A free turbine turboshaft engine comprises a gas generator provided with a compressor, a combustion chamber and a high-pressure expansion assembly connected to the compressor. The compressor may be provided with one or more compression stages. Similarly, the expansion assembly may comprise one or more expansion turbines. Furthermore, the free turbine turboshaft engine comprises at least one low pressure power turbine that is said to be "free", i.e., it is rotationally independent of the compressor of the high-pressure expansion assembly.

The operation of the turboshaft engine is controlled by a control system. For example, a control system is known as a Full Authority Digital Engine Control or FADEC. A control system conventionally comprises a computer connected to various sensors and a fuel metering valve. The fuel metering valve enables the control system to control the flow rate of fuel delivered to the turboshaft engine.

The control system conventionally comprises a selector, that is referred to for convenience as a "control selector". For example, the control selector comprises three positions.

When the control selector is in a first position referred to, for example, as the "STOP position", the turboshaft engine is off.

When the control selector is in a second position referred to, for example, as the "FLIGHT position", the turboshaft engine is in nominal operation. The turboshaft engine can then operate in a plurality of standard flight ratings.

Conventionally, the flight ratings include a take-off rating wherein an engine can produce a maximum take-off power or MTOP for a limited period of use, and a maximum continuous rating wherein an engine can produce a maximum continuous power or MCP for an unlimited time period. Twin-engine aircraft may comprise emergency ratings that can be used in the event of one engine failing, as follows: (i) a first emergency rating that makes it possible, for example, to produce a super-contingency power or OEI30' of approximately 112% to 120% of the MTOP, and can possibly be used for a maximum of thirty consecutive seconds three times during a flight; (ii) a second emergency rating OEI2" that makes it possible, for example, to produce a maximum contingency power of approximately 105% to 110% of the MTOP, possibly for two consecutive minutes; and (iii) a third emergency rating OEICont that makes it possible, for example, to produce an intermediate contingency power greater than or equal to the MTOP continuously for the remainder of the flight after the failure of the turboshaft engine.

Finally, the control selector comprises an intermediate position referred to, for example, as the "IDLE position". When the control selector is positioned in this IDLE position, the turboshaft engine operates at an idle rating. When the idle rating is applied, an engine produces non-zero idle power, that is less than the power produced when flight ratings are applied.

When a rotary-wing aircraft with several engines is started up, the starting procedure requires the pilot to start the two engines sequentially. Next, in order to carry out the various operations required on the ground, and in particular to move the aircraft from its parking area to a take-off area during a phase of moving the aircraft on the ground, that is conventionally referred to as taxiing, the selectors need to be switched to the FLIGHT position.

Similarly, the engines are stopped at the end of a flight, when the aircraft is stationary, i.e., after a phase of movement on the ground.

The use of a twin-engine power plant is advantageous. However, the fuel consumption of the aircraft is impacted on the ground by the fact that several engines are operating. A rotary-wing aircraft differs from an airplane in that it is likely to land during a mission without being able to refuel. The fuel consumption on the ground is therefore a parameter that should not be overlooked.

Moreover, a rotary-wing aircraft is likely to land in a zone where noise and/or fine particle emissions are important considerations. The operation of several engines may have an impact on noise and/or fine particle emissions.

In this context, patent FR 2 967 132 B1 describes a method for optimizing the specific fuel consumption of a helicopter having two turboshaft engines. According to this method, the two turboshaft engines supply substantially different amounts of power. During stabilized flight, one of the turboshaft engines can operate at a continuous operating rating, producing a power close to its maximum take-off power but less than or equal to its maximum continuous power, while the other turboshaft engine is put on standby with zero power and the combustion chamber switched off. If a conventional restart fails, the restart may be carried out by emergency assistance through additional firing of the combustion chamber.

Patent FR 2 967 133 B1 describes a method for optimizing the specific fuel consumption of a helicopter having two turboshaft engines. According to this method, one of the turboshaft engines can operate, during flight, at a continuous operating rating while the other turboshaft engine operates at a super-slow rating at zero power. If a conventional restart fails, the turboshaft engine operating at a super-slow rating can be restarted by emergency assistance produced by a self-contained energy source dedicated to this restart.

Document FR 3 011 587 A1 describes a method for optimizing the specific fuel consumption of a helicopter having two turboshaft engines. According to this method, each turboshaft engine can operate alone at a continuous flight rating, the other turboshaft engine then being at a super-slow rating at zero power. The super-slow rating is obtained with the combustion chamber of the gas generator switched on and assistance provided by the mechanical rotation of a shaft of the gas generator.

Document FR 3 001 525 A1 describes a reduced power super-slow rating implemented by supplying fuel to the starting injectors and interrupting the supply to main injectors.

Document FR 2 871 138 describes a transmission mechanism between at least one accessory and engines for driving a rotorcraft rotor selectively, separately or together.

Documents EP 2 735 512 A1 and US 2018/0187604 A1 are also known.

SUMMARY

An object of the present disclosure is thus to propose an innovative method for a multi-engine rotary-wing aircraft, in particular for reducing its fuel consumption.

The disclosure thus relates to a method for controlling a rotary-wing aircraft, said aircraft having a power plant comprising at least two engines burning fuel and a transmission system connected to the rotary wing, each engine having a power shaft connected to the transmission system.

This method comprises, on the ground, an energy-saving phase applicable on the ground and comprising at least one energy-saving period. This energy-saving period comprises controlling, at an active rating, with a control system, one active engine from the at least two engines, in order to ensure rotation of the rotary wing, the active engine producing, at the active rating and with its power shaft, a non-zero active driving power. The energy-saving period comprises, together with the control of the active engine at the active rating, use of the control system to stop or control, at an inactive rating, each inactive engine from the at least two engines that is not the active engine, the inactive engine at the inactive rating producing, with its power shaft, a non-zero power that is less than the active driving power, or zero power, possibly with a gas generator in motion.

The expression "on the ground" refers to an aircraft resting on a surface, for example on ground consisting of earth or the like, a building, a ship, a platform, etc.

The expression "active engine" refers to one of the engines producing a driving power during an energy-saving period, this active engine being able, for example, to produce an active driving power greater than or equal to an idle power.

In particular, each engine may, for example, operate at an idle rating, enabling a non-zero idle power to be produced with its power shaft, and at at least one flight rating enabling a flight power to be produced with its power shaft. The flight power is then greater than the idle power. Therefore, the active rating may be the idle rating or the flight rating. Using a flight rating as the active rating helps optimize the stability of the aircraft, whereas using the idle rating as the active rating reduces the fuel consumption more significantly.

Conversely, the expression "inactive engine" refers to the engine or engines that are switched off or set at an inactive rating, in particular in order to reduce the fuel consumption.

In particular, an engine is said to be "stopped" or "switched off" when none of the components of the engine is moving.

The engines of a twin-engine rotary-wing aircraft of the prior art are all in operation when on the ground, i.e., a flight rating is implemented. A phase of moving the aircraft on the ground is therefore carried out by moving the rotary wing with all of the engines, that permanently apply a flight rating. Furthermore, a significant proportion of the operating time of the engines corresponds to operation on the ground.

In this context, when the energy-saving phase according to the disclosure is engaged, the engines operate asymmetrically, the inactive engine or engines being either stopped or operating at an inactive rating. Therefore, only one engine is, for example, started on the ground in order to carry out all of the planned operations, the other engine or engines only being rendered active during the actual take-off phase.

The expression "take-off phase" refers to the phase wherein the aircraft is in its take-off area and lifts off the ground. The energy-saving phase is undertaken before this take-off phase, for example when the aircraft is moving on the ground from a parking area to the take-off area.

As a result, setting at least one engine to the inactive rating or stopping it when on the ground can help reduce fuel consumption on the ground and limit fine particle and/or noise emissions. Such a reduction in fuel consumption can make it possible to increase the duration of the mission or the aircraft's range, or even simply to make financial savings. In zones with significant environmental constraints, for example close to a hospital, the energy-saving period can limit the emission of fine particles and/or noise pollution.

Furthermore, this method may be compatible with the requirements of certification regulations. Indeed, it is not imperative to guarantee rapid start-up of the inactive engine or engines. A failure preventing the active engine or engines from starting is not a catastrophic event because the aircraft is on the ground and therefore is not at risk of crashing. This method therefore does not necessarily need to be associated with a costly and/or cumbersome restart system.

The method may further comprise one or more of the following features, taken individually or in combination.

According to one example, the method may comprise activating the energy-saving phase by means of a human-machine selection interface of the control system.

The human-machine selection interface can therefore be operated by a human pilot in order for the energy-saving phase to be initiated. For example, the human-machine selection interface transmits a control signal to engine computers or to a management computer controlling the engine computers in order for the engine computers to apply, on the ground, the rating or ratings required according to the method of the disclosure.

The term "signal" refers throughout the text to an analog, digital, electrical or optical signal, for example.

The active engine may be chosen by a crew, cyclically, randomly or according to a predetermined logic. For example, a particular engine may always be used as the active engine. According to another example, the control system may apply another logic to designate the active engine, such as an alternation logic, a logic based on engine health or maintenance information, a logic based on events or conditions outside the engine perimeter such as the wind direction, the preferred boarding side for passengers, etc.

According to one possibility compatible with the preceding possibilities, the control system being able to comprise, for each engine, a human-machine starting interface specific to this engine configured to prompt, at the choice of a pilot, the stopping of the engine and the application of an idle rating and the application of at least one flight rating to be reached during flight, the method may comprise, prior to the energy-saving phase: controlling the active engine, with the control system, at the idle rating set with the human-machine starting interface of this active engine; or controlling the engines, with the control system, at the idle rating set with the respective human-machine starting interfaces.

Therefore, at least one engine is started in a conventional manner, being set to the idle rating, and then to a flight rating, with its human-machine starting interface. A pilot can then operate the abovementioned human-machine selection interface to apply the energy-saving phase, each engine then possibly changing its operating rating.

The flight rating or ratings may be chosen from a list comprising the take-off rating, the maximum continuous rating, the first emergency rating OEI30', the second emergency rating OEI2" and the third emergency rating OEICont described above.

Said human-machine selection interface may possibly be separate from the human-machine starting interfaces. The human-machine starting interfaces may be in the form of a conventional stop/idle/flight three-position switch.

According to one possibility compatible with the preceding possibilities, the energy-saving period may comprise at least one of the following steps: controlling the rotary wing to taxi the aircraft on the ground; opening a door to embark or disembark at least one passenger or goods on the ground; and a waiting step wherein no control interface of the aircraft is operated by a crew.

The energy-saving period not only allows the active engine to be started, but can also be used to carry out normal ground operations, and in particular to rotate the rotary wing in order to taxi the aircraft on the ground.

According to one possibility compatible with the preceding possibilities, the energy-saving phase may comprise one or more alternating operating phases, the one or more alternating operating phases comprising an energy-saving period and a joint operation period, said joint operation period comprising controlling the engines at the active rating with the control system.

According to one variant, the energy-saving phase comprises a single alternating operating phase. The aircraft is controlled in such a way as to carry out all ground operations during the energy-saving period. When a take-off is possible, a pilot or a controller operates the control system to apply the joint operation period in order to reactivate the inactive engine or engines.

According to another variant, said energy-saving phase may comprise at least two alternating operating phases.

This solution may, for example, allow the correct operation of all of the engines to be checked during the joint operation period of the first alternating operating phase, before returning to an energy-saving period during the second alternating operating phase that follows.

The inactive engine or engines may possibly produce different powers with their power shafts in the two energy-saving periods of the two alternating operating phases.

For example, when the aircraft is started up, said energy-saving phase may comprise a first alternating operating phase and one or more second alternating operating phases, the inactive engine being switched off by the control system during the first alternating operating phase and switched to the inactive rating during the second alternating operating phase or phases.

This feature helps optimize the service life of the engines.

According to one possibility, each of said energy-saving period and joint operation period may be applied for a predetermined time period.

According to one possibility compatible with the preceding possibilities, the energy-saving phase may be a pre-take-off phase at the start of a mission, an intermediate phase on the ground during a mission or an end-of-mission phase.

In other words, an energy-saving phase can be implemented during each part of a mission taking place on the ground in order to optimize the fuel consumption and/or noise emissions and/or fine particle emissions.

According to one possibility compatible with the preceding possibilities, the energy-saving phase may be a pre-take-off phase at the start of a mission comprising a single energy-saving period followed by a single joint operation period, or several alternating operating phases each comprising an energy-saving period followed by a joint operation period.

According to one possibility compatible with the preceding possibilities, the energy-saving phase may be an end-of-mission phase comprising a single joint operation period followed by a single energy-saving period, or several alternating operating phases each comprising a joint operation period followed by an energy-saving period.

According to one possibility compatible with the preceding possibilities, the energy-saving phase may be an intermediate phase on the ground during a mission comprising a joint operation period after landing followed by one or more alternating operating phases comprising a joint operation period followed by an energy-saving period.

According to one possibility compatible with the preceding possibilities, the method may comprise a take-off phase comprising controlling each engine at a flight rating, with the control system, each engine producing, with its power shaft, a driving power greater than the idle power.

When the aircraft is initially started up or during an intermediate phase of a mission carried out between two air-bound parts of the mission, the method can implement the energy-saving phase in order to optimize the fuel consumption and/or the noise emissions and/or fine particle emissions, then a take-off phase as such engaging all of the engines jointly in order to produce sufficient driving power to take off.

According to one possibility compatible with the preceding possibilities, the method may comprise activation by a human of the take-off phase with a human-machine starting interface of the control system, in order to control the engines according to a flight rating.

In addition to a method, the disclosure relates to a rotary-wing aircraft, said aircraft having a power plant comprising at least two engines burning fuel and a transmission system connected to the rotary wing, each engine having a power shaft connected to the transmission system. This aircraft comprises a control system configured to apply the control method according to the disclosure.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Figure 1:
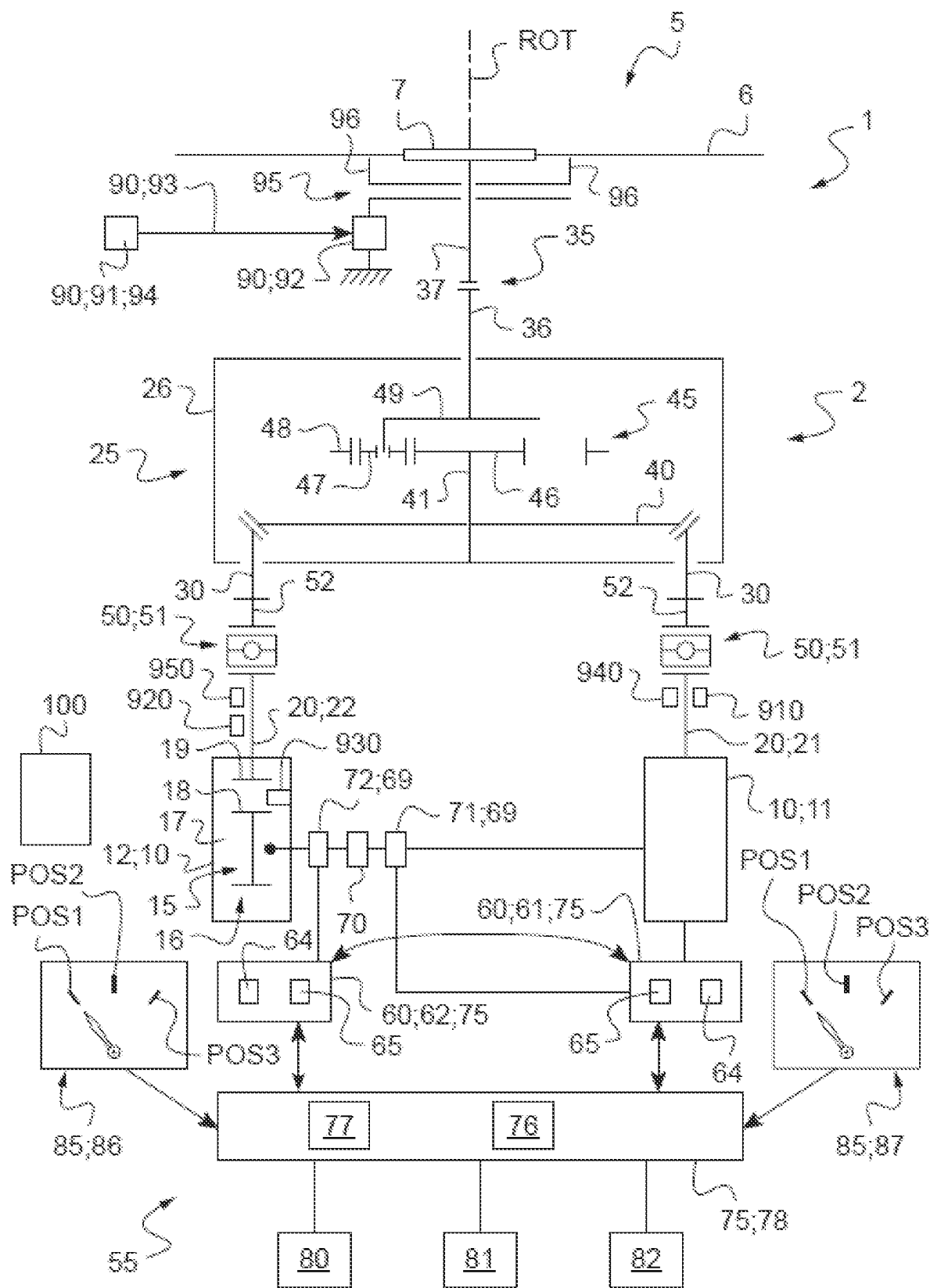
FIG. 1 is a view of an aircraft according to the disclosure.

FIG. 1 shows an example of an aircraft 1 according to the disclosure. This aircraft 1 comprises a rotary wing 5. The rotary wing 5 comprises a plurality of blades 6 that are able to rotate about an axis of rotation ROT of the rotary wing 5, the blades 6 being, for example, carried by a hub 7 or the like.

The pitch of the blades 6 may be controlled by a conventional flight control device 90. For example, such a flight control device 90 may comprise a cyclic pitch lever 91 and a collective pitch lever 94 that are connected by a connection system 93 to several servocontrols 92. Each servocontrol 92 may be hinged to a system of swashplates 95 connected by pitch rods 96 to the respective blades 6.

According to another aspect, the aircraft 1 may comprise at least one door 100 through which persons and/or freight can be embarked and disembarked.

The aircraft 1 comprises a power plant 2 for rotating the rotary wing 5 in order to ensure the lift, and the forward movement, of the aircraft 1. This power plant 2 is provided with at least two engines 10. Reference 10 denotes any engine, and references 11, 12 denote particular engines in order to identify a specific engine 10 when required.

According to one example, at least one engine 10 may be a turboshaft engine. Such a turboshaft engine 10 comprises a gas generator 15 that is provided with at least one compression turbine 16, a combustion chamber 17 into which fuel is injected and at least one expansion turbine 18 constrained to rotate with the compression turbine or turbines 16. Moreover, the turboshaft engine 10 may comprise at least one free turbine 19 that sets a power shaft 20 of the engine in motion directly or indirectly.

Irrespective of the type of engines, each engine 10 therefore comprises a power shaft 20 connected to a power transmission system 25. The power transmission system 25 is connected to the rotary wing 5 in a conventional manner. Reference 20 denotes any power shaft, references 21, 22 denoting particular power shafts of the two engines 11, 12 respectively.

By way of illustration, the power transmission system 25 may be provided with a gearbox 26 that is mechanically interposed between the engines 20 and the rotary wing 5. For example, the gearbox 26 comprises a rotor mast 35 provided with one or more collinear shafts 36, 37 connected to the rotary wing 5 and, according to the example, to the hub 7. The gearbox 26 may be provided with one input shaft 30 for each engine 20 and various gears arranged between the input shafts 30 and the rotor mast 35. According to one example given by way of illustration, each input shaft 30 is meshed with a large wheel 40. This large wheel 40 is then mechanically connected by an inner shaft 41 to a sun gear 46 of a power reduction stage 45. Planet gears 47 are then meshed with the sun gear 46 and with a toothed ring gear 48 that is stationary in the reference frame of the aircraft. Moreover, the planet gears 47 are carried by a planet carrier 49 that is constrained to rotate with the rotor mast 35. Therefore, each input shaft 30 is rotated by an output shaft 20 of an engine 10 directly or via a respective input transmission channel.

The power transmission system 25 and, according to the example shown, an input transmission channel, may comprise at least one free-wheel 51, and/or at least one connecting shaft 52, and/or at least one connector allowing misalignments, etc.

The literature describes various types of gearboxes and various kinematic linkages, the described example being given purely by way of illustration.

Moreover, the engines 10 are heat engines that operate with fuel. Therefore, the aircraft 1 comprises a control system 55 for controlling the power delivered by each engine 10 with its power shaft 20.

The control system 55 thus comprises one fuel metering valve 69 for each engine 10. Each engine 10 is then connected, via its own fuel metering valve 69, to at least one fuel tank 70. Reference 69 denotes any fuel metering valve, references 71, 72 denoting particular fuel metering valves of the two engines 11, 12 respectively.

The control system 55 may comprise one engine computer 60 for each engine 10. For example, each engine computer 60 may comprise at least one processor 64 and at least one memory 65, at least one integrated circuit, at least one programmable system, or at least one logic circuit, these examples not limiting the scope to be given to the term "engine computer". The engine computers may communicate with each other via wired or wireless links.

According to the described example, the power plant 2 comprises two engine computers 61, 62 respectively controlling two engines 11, 12. Each engine computer is configured to control the associated engine and make it operate according to the required rating, for example so that the controlled engine produces a power that tends towards a limit power of this rating. Each engine computer 61, 62 can in particular control the fuel metering valve 71, 72 of this engine 11, 12. Each engine computer 61, 62 may be connected to multiple control sensors for controlling the associated engine 11, 12, such as, for example, a temperature sensor 930 measuring the gas temperature, for example at the inlet of a free turbine, a speed sensor measuring, for example, the speed of rotation of a gas generator of the turboshaft engine, a torquemeter 910, 920 measuring an engine torque on a rotating member, a speed sensor 940, 950 measuring, for example, the speed of rotation of this rotating member. Such a rotating member may be a power shaft 20 of an engine 10. Moreover, the power plant 2 may also comprise control sensors comprising a torquemeter measuring a torque applied to the rotor mast 35, a speed sensor measuring, for example, the speed of rotation of this rotor mast 35, a sensor measuring the outside pressure, a sensor measuring the outside temperature, etc.

The engine computers 60 may form a controller 75 applying the method of the disclosure, or a management computer 78 of the control system 55 may act as a controller 75 controlling the engine computers 60. For example, the management computer 78 may comprise at least one processor 76 and at least one memory 77, at least one integrated circuit, at least one programmable system, or at least one logic circuit, these examples not limiting the scope to be given to the term "management computer". The management computer 78 may communicate via wired or wireless links with each engine computer 60, or may be merged with at least one engine computer 60. The management computer 78 may communicate with each of the abovementioned measurement systems.

Irrespective of its composition, the controller 75 can communicate via a wired or wireless link with at least one alerter 80 for providing information to a pilot. Such an alerter 80 may, for example, comprise a display capable of displaying a message, a light-emitting diode that lights up at the command of the controller 75, a loudspeaker, etc.

Furthermore, the controller 75 can communicate with a human-machine stopping interface 82 and/or a human-machine selection interface 81.

Furthermore, the controller 75 can communicate with one human-machine starting interface 85 for each engine, i.e., two interfaces 86, 87 according to the example provided. Each human-machine starting interface 85 may, for example, transmit a signal carrying an order to stop the engine in question, an order to set it to the idle rating or an order to set it at a flight rating. FIG. 1 shows interfaces with three positions, "stop" POS1/"idle" POS2/"flight" POS3, to this effect.

Each human-machine interface 81, 82, 85 may comprise a member that can be operated by a pilot, such as a knob or a lever, for example, a touch screen, a voice command, etc.

According to the example shown, the human-machine interfaces 81, 82, 85 and the alerter 80 communicate with the management computer 78. Alternatively, or additionally, the human-machine interfaces 81, 82, 85 and the alerter 80 communicate with one or each engine computer 60.

Figure 2:
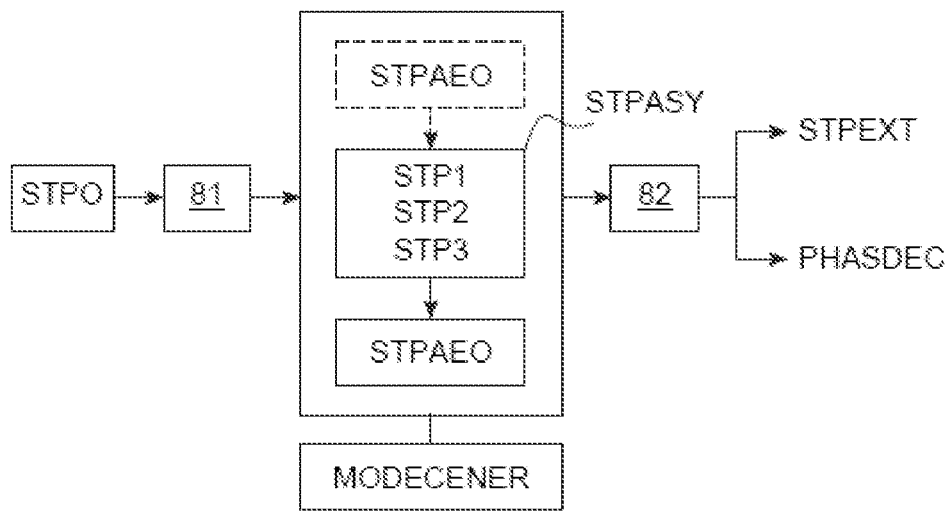
FIG. 2 is a diagram showing the applied method.

FIG. 2 shows the control method according to the disclosure, this method being able to be implemented by a rotary-wing aircraft 1 of the type shown in FIG. 1. The method is shown with the use of the control system 55 of FIG. 1. However, this method can be applied with a control system that does not have a management computer 78, the engine computers 60 being easy to configure in order to apply it.

This control method comprises implementing, on the ground, i.e., when a landing gear of the aircraft 1 is resting on the ground, an energy-saving phase MODECENER.

Before the energy-saving phase MODECENER, the method may comprise controlling STP0 one or more of the engines 11, 12 to the idle rating. For example, at least one human-machine starting interface 85 is positioned in the idle position, the engine computer or computers 60 controlling the respective engine or engines 10 to the idle rating at the order of the management computer 78.

The energy-saving phase MODECENER may then be triggered, for example manually by operating the human-machine selection interface 81.

A pilot operates the human-machine selection interface 81, that transmits a control signal to the controller 75. The controller 75 may be configured to check that one or more required conditions are met and, if this is the case, to trigger the energy-saving phase MODECENER.

Irrespective of the method used to trigger the energy-saving phase MODECENER, this energy-saving phase MODECENER comprises one or more energy-saving periods STPASY. This energy-saving period STPASY comprises controlling, with the control system 55, an engine 10 referred to as the "active engine" at an active rating, and jointly stopping or controlling at an inactive rating the other engine or engines, that are referred to as the "inactive engine or engines".

The active engine 10 at the active rating is controlled by its engine computer 60 to produce a non-zero active driving power PWACT with its power shaft 20. This active driving power PWACT may be sufficient on its own to rotate the rotary wing 5, and allow the aircraft 1 to move on the ground with only the engine 10 active.

According to the examples shown, the active rating may be the idle rating. In this case, this active driving power PWACT is the idle power PWRAL less than an in-flight driving power PWVOL used during at least one flight rating that can be used during a take-off phase, during flight and during a landing phase. The driving power when idling is possibly less than the maximum continuous power.

According to another example, the active rating may be a flight rating. In this case, the active driving power PWACT is greater than the idle power PWRAL, and equal to an in-flight driving power PWVOL and possibly to the maximum continuous power.

Conversely, an inactive engine 10 at the inactive rating does not produce any driving power through its power shaft 20, with a gas generator possibly set in motion via an external starter, or produces a non-zero super-slow power PWSR, possibly with the combustion chamber switched on. The super-slow power PWSR is less than the active driving power PWACT and even than the idle power PWRAL.

For example, the management computer 78 transmits a control signal to each engine computer 60 to apply the required rating to each engine 10. According to another example, each engine computer 60 receives the control signal and is configured to apply the required rating accordingly.

Therefore, each engine computer 60 controls, in particular, the associated fuel metering valve 69 as a function of the signals transmitted by the control sensor or sensors in order for the controlled engine 10 to produce the required driving power with its power shaft 20.

The energy-saving phase MODECENER possibly also comprises at least one alternating operating phase, the one or more alternating operating phases comprising a joint operation period STPAEO and an energy-saving period STPASY. According to the scenarios described below, the joint operation period STPAEO may take place before the energy-saving period STPASY as shown in dotted lines or after the energy-saving period STPASY as shown in solid lines.

The joint operation period STPAEO comprises controlling all of the engines 10 at active rating, with the control system 55. At the active rating, each engine 10 then produces, with its power shaft 20, the active driving power PWACT and possibly the idle power PWRAL.

The switch from the joint operation period STPAEO to the energy-saving period STPASY, or vice versa, may be required by the controller 75. For example, the controller 75 may be configured to change period after a predetermined time period, and/or following the operation of an interface and, for example, the human-machine stopping interface 82.

During the energy-saving period, at least one of the following steps may be carried out: controlling STP1 the rotary wing 5 with the flight control device 90 in order to taxi the aircraft 1 on the ground; opening STP2 a door 100 to embark or disembark at least one passenger or goods on the ground; and a waiting step STP3 wherein no control interface of the aircraft is operated by a crew.

The energy-saving phase MODECENER may finally be interrupted, for example manually by means of the human-machine starting interfaces 85. These human-machine starting interfaces 85 can transmit stop signals to the controller 75 to either stop STPEXT all of the engines 10 that are still operating, by positioning them in the abovementioned position POS1, or, on the contrary, to prompt the application of a flight rating with each engine 10 in order to initiate a take-off phase PHASDEC by positioning them in the abovementioned position POS3.

Indeed, the energy-saving phase may be a pre-take-off phase at the start of a mission followed by a take-off phase, or an intermediate phase on the ground during a mission preceded by a landing phase and followed by a take-off phase, or an end-of-mission phase followed by the stopping of the engines 10.

FIGS. 3 to 7 show various configurations by means of diagrams displaying a driving power produced by each engine 10 on the Y-axis and time on the X-axis. These examples show the power produced by a first engine 11 of a twin-engine aircraft 1 in solid lines and the power produced by a second engine 12 of the aircraft 1 in dotted lines. These examples show an active rating of the idle rating type enabling the active engine to produce an active driving power PWACT equal to the idle power PWRAL with its working shaft. Alternatively, the active rating may be a rating enabling the active engine to produce an active driving power PWACT greater than the idle power PWRAL, and possibly equal to a flight power, with its working shaft.

Figure 3:
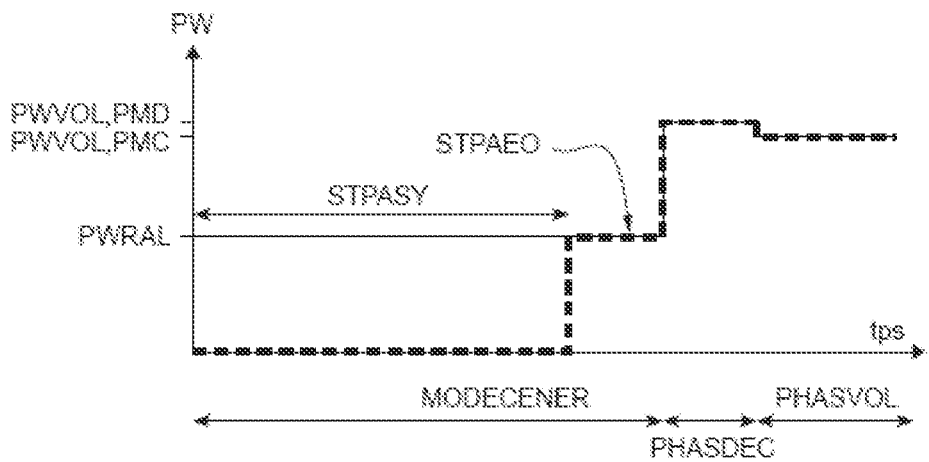
FIG. 3 is a diagram showing an example of the method applied when the aircraft takes off.

FIG. 3 shows a first example of the application of the disclosure at the start-up of an aircraft 1. When the energy-saving phase MODECENER is initialized, the first engine 11 is started by means of its human-machine starting interface 85 positioned in the "idle" position POS2. The human-machine selection interface 81 is operated, if required. The energy-saving period STPASY then begins. The first engine 11 supplies an active driving power, that is equal to the idle power PWRAL according to the example, and is sufficient to set the rotary wing 5 in motion. The second engine 12 is stopped, in the example shown, but could operate at the inactive rating, first being started by positioning its human-machine starting interface 85 in the "idle" position POS2. In predetermined conditions, for example after operating the human-machine stopping interface 82 or following a predetermined time period, the joint operation period STPAEO is activated. The first engine 11 and the second engine 12 are controlled to produce the active driving power PWACT, that is equal to the idle power PWRAL according to the example. The take-off phase PHASDEC is then activated by positioning the human-machine starting interfaces 85 in the "flight" position POS3.

During the take-off phase PHASDEC, the first engine 11 and the second engine 12 are controlled to each produce an in-flight operating power PWVOL, for example the maximum take-off power MTOP. The aircraft 1 takes off, and a flight phase PHASVOL is then initiated. The first engine 11 and the second engine 12 are controlled to produce an in-flight operating power PWVOL, for example the maximum continuous power MCP.

Figure 4:
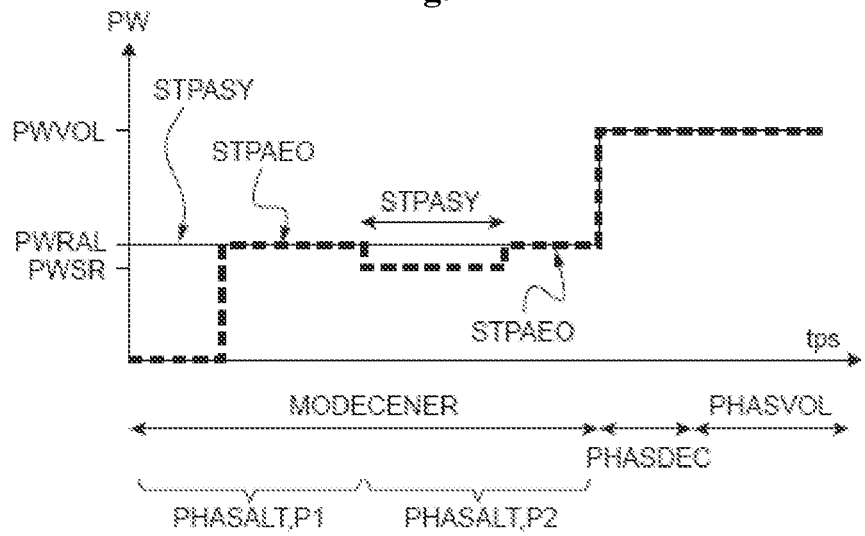
FIG. 4 is a diagram showing an example of the method applied when the aircraft takes off.

FIG. 4 shows a second example of the application of the disclosure at the start-up of an aircraft 1. According to this second example, the energy-saving phase MODECENER comprises several alternating operating phases PHASALT, each alternating operating phase PHASALT comprising an energy-saving period STPASY followed by a joint operation period STPAEO. The switch from one alternating operating phase to another may be implemented after a time period has elapsed or by means of the human-machine stopping interface 82, for example. For example, the inactive engine 12 is switched off, by the control system 55, during the first alternating operating phase P1, and switched to the inactive rating to produce a non-zero power PWSR during the second alternating operating phase or phases P2.

Figure 5:
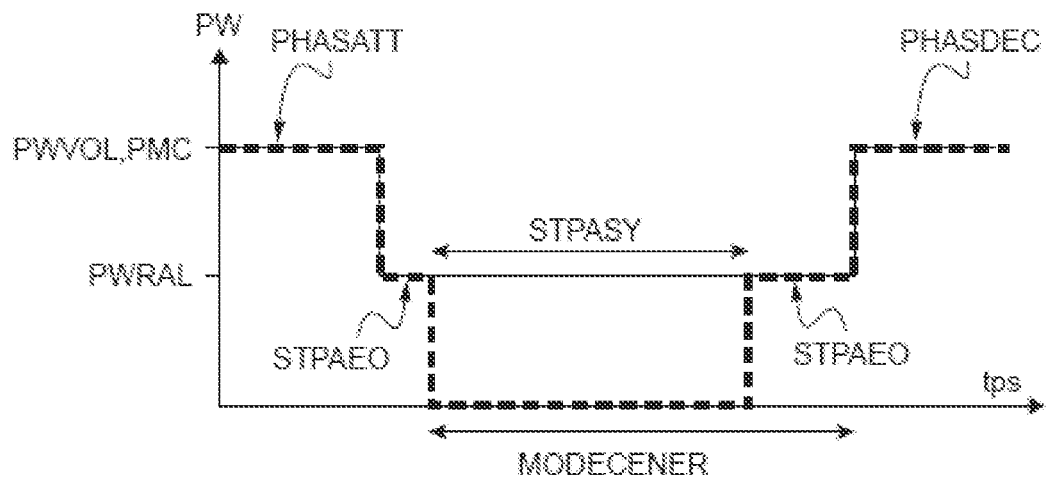
FIG. 5 is a diagram showing an example of the method applied when the aircraft is on a mission.

FIG. 5 shows an example of the application of the disclosure during a mission. During a landing phase, each engine 10 operates according to a flight rating, for example by producing the maximum continuous power MCP. Once the aircraft 1 has landed on the ground, the human-machine starting interfaces 85 are positioned in the "idle" position. A joint operation period STPAEO is thus implemented. The energy-saving phase MODECENER is then activated, for example by maneuvering the human-machine selection interface 81. The first engine 11 is controlled by its engine computer 61 to become the active engine 10 used during the energy-saving period STPASY. The first engine 11 supplies the active driving power PWACT, that is equal to the idle power PWRAL according to the example. The second engine 12 is stopped, in the example shown, but could operate at the inactive rating, by being controlled by its engine computer 62. In predetermined conditions, the joint operation period STPAEO is activated, for example by operating the human-machine stopping interface 82. The first engine 11 and the second engine 12 are controlled by the engine computers 61, 62 to produce the active driving power PWACT, that is equal to the idle power PWRAL according to the example. The take-off phase PHASDEC is then activated by commands from the human-machine starting interfaces 85, that are positioned in the flight positions, for example. The first engine 11 and the second engine 12 are controlled to produce an in-flight operating power PWVOL, for example the maximum take-off power MTOP.

Figure 6:
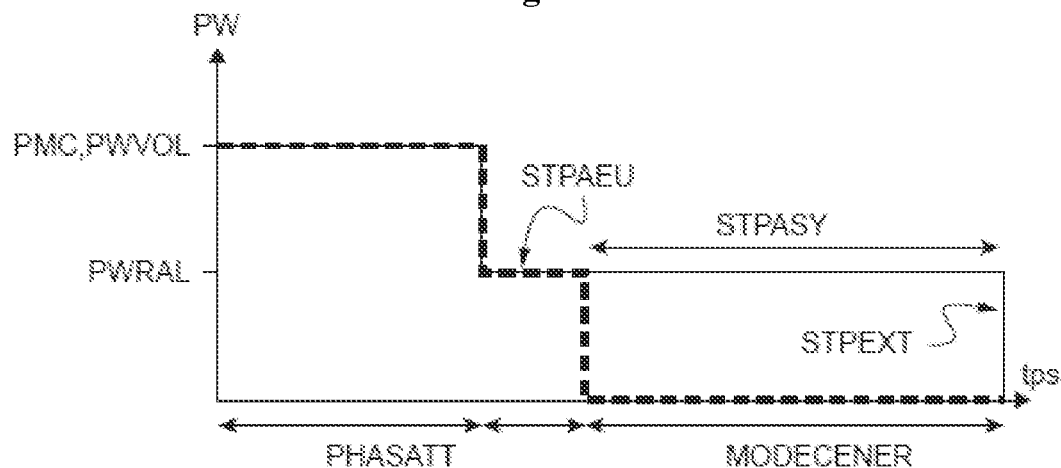
FIG. 6 is a diagram showing an example of the method applied when the aircraft reaches the end of a mission.

FIG. 6 shows a first example of the application of the disclosure at the end of a mission. During a landing phase, each engine 10 operates according to a flight rating, for example by producing the maximum continuous power MCP. Once the aircraft 1 has landed on the ground, the human-machine starting interfaces 85 are positioned in the "idle" position. The energy-saving phase MODECENER is then activated, for example by maneuvering the human-machine selection interface 81. The first engine 11 is controlled to become the active engine 10 used during the energy-saving period STPASY. The first engine 11 supplies the active driving power PWACT, that is equal to the idle power PWRAL according to the example. The second engine 12 is stopped, in the example shown, but could operate at the inactive rating. In predetermined conditions, all of the engines 10 are stopped, for example by maneuvering the human-machine starting interfaces 85 to position them in the "stop" position POS1.

Figure 7:
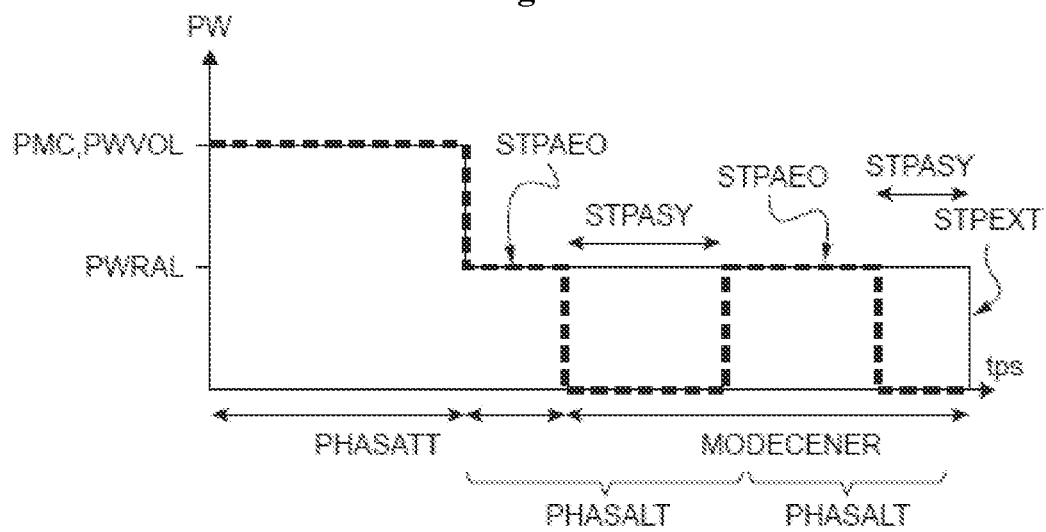
FIG. 7 is a diagram showing an example of the method applied when the aircraft reaches the end of a mission.

FIG. 7 shows a second example of the application of the disclosure at the end of a mission. According to this second example, the energy-saving phase MODECENER comprises several alternating operating phases PHASALT, each alternating operating phase PHASALT comprising a joint operation period STPAEO followed by an energy-saving period STPASY.

Naturally, the present disclosure is subject to numerous variations as regards its implementation. Although several embodiments are described above, it is possible to envisage replacing any of the means described by equivalent means without going beyond the ambit of the claims of the present disclosure.

What is claimed is:

1. A method for controlling an aircraft with a rotary wing, the aircraft having a power plant comprising at least two engines burning fuel and a transmission system connected to the rotary wing, each engine having a power shaft connected to the transmission system, the method comprising an energy-saving phase applicable on the ground and comprising at least one energy-saving period, this energy-saving period comprising controlling, at an active rating, with a control system, one active engine from the at least two engines, in order to ensure rotation of the rotary wing, the active engine producing, at the active rating and with its power shaft, a non-zero active driving power, the energy-saving period comprising, together with the control of the active engine at the active rating, use of the control system to stop or control, at an inactive rating, each inactive engine from the at least two engines that is not the active engine, the inactive engine at the inactive rating producing, with its power shaft, a non-zero power that is less than the active driving power or zero power, wherein the energy-saving phase comprises at least two alternating operating phases, each alternating operating phase comprising an energy-saving period and a joint operation period, the joint operation period comprising controlling the engines at the active rating with the control system.

2. The method according to claim 1,
wherein the method comprises activating the energy-saving phase by means of a human-machine selection interface of the control system.

3. The method according to claim 1,
wherein, the control system comprising, for each engine, a human-machine starting interface specific to this engine configured to prompt, at the choice of a pilot, the stopping of the engine and the application of an idle rating and the application of at least one flight rating to be reached during flight, the method comprises, prior to the energy-saving phase: controlling the active engine, with the control system, at the idle rating set with the human-machine starting interface of this active engine; or controlling the engines, with the control system, at the idle rating set with the respective human-machine starting interfaces.

4. The method according to claim 2,
wherein, the control system comprising, for each engine, a human-machine starting interface specific to this engine configured to prompt, at the choice of a pilot, the stopping of the engine and the application of an idle rating and the application of at least one flight rating to be reached during flight, the method comprises, prior to the energy-saving phase: controlling the active engine, with the control system, at the idle rating set with the human-machine starting interface of this active engine; or controlling the engines, with the control system, at the idle rating set with the respective human-machine starting interfaces, and wherein the human-machine selection interface is separate from the human-machine starting interfaces.

5. The method according to claim 1,
wherein, each engine being able to operate at an idle rating, enabling a non-zero idle power to be produced with its power shaft, and at at least one flight rating enabling a flight power greater than the idle power to be produced with its power shaft, the active rating is the idle rating.

6. The method according to claim 1,
wherein the energy-saving period comprises at least one of the following steps: controlling the rotary wing in order to taxi the aircraft on the ground; opening a door to embark or disembark at least one passenger or goods on the ground; and a waiting step wherein no control interface of the aircraft is operated by a crew.

7. The method according to claim 1,
wherein each of the energy-saving period and joint operation period is applied for a predetermined time period.

8. The method according to claim 1,
wherein the inactive engine produces different powers with its power shaft in the two energy-saving periods of the two alternating operating phases.

9. The method according to claim 8,
wherein, when the aircraft is started up, the energy-saving phase comprises a first alternating operating phase and one or more second alternating operating phases, the inactive engine being switched off by the control system during the first alternating operating phase and switched to the inactive rating during the second alternating operating phase or phases.

10. The method according to claim 1,
wherein the energy-saving phase is a pre-take-off phase at a start of a mission, or an intermediate phase on the ground during a mission or an end-of-mission phase.

11. The method according to claim 1,
wherein the energy-saving phase is a pre-take-off phase at a start of a mission comprising a single energy-saving period followed by a single joint operation period, or several alternating operating phases each comprising an energy-saving period followed by a joint operation period.

12. The method according to claim 1,
wherein the energy-saving phase is an end-of-mission phase comprising a single joint operation period followed by a single energy-saving period, or several alternating operating phases each comprising a joint operation period followed by an energy-saving period.

13. The method according to claim 1,
wherein the energy-saving phase is an intermediate phase on the ground during a mission comprising a joint operation period after landing followed by one or more alternating operating phases comprising a joint operation period followed by an energy-saving period.

14. The method according to claim 1,
wherein the method comprises a take-off phase comprising controlling each engine at a flight rating with the control system, each engine producing, with its power shaft, a driving power greater than an idle power.

15. The method according to claim 14,
wherein the method comprises activation by a human of the take-off phase with a human-machine starting interface of the control system, in order to control the engines according to a flight rating.

16. An aircraft with a rotary wing, the aircraft having a power plant comprising at least two engines burning fuel and a transmission system connected to the rotary wing, each engine having a power shaft connected to the transmission system,
wherein the aircraft comprises a control system configured to apply the method according to claim 1.

* * * * *